US012555898B2

(12) United States Patent
Weinzierle et al.

(10) Patent No.: US 12,555,898 B2
(45) Date of Patent: Feb. 17, 2026

(54) RADIO FREQUENCY UNIT, FILL LEVEL MEASURING DEVICE, AND METHOD

(71) Applicant: VEGA Grieshaber KG, Wolfach (DE)

(72) Inventors: Christian Weinzierle, Wolfach (DE); Christoph Mueller, Oppenau (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 97 days.

(21) Appl. No.: 18/431,147

(22) Filed: Feb. 2, 2024

(65) Prior Publication Data

US 2024/0266724 A1 Aug. 8, 2024

(30) Foreign Application Priority Data

Feb. 2, 2023 (DE) ..................... 10 2023 200 856.4

(51) Int. Cl.

*H01Q 1/40* (2006.01)
*H01Q 1/22* (2006.01)
*H01Q 1/42* (2006.01)
*H01Q 9/04* (2006.01)
*H01Q 13/02* (2006.01)

(52) U.S. Cl.

CPC ............... *H01Q 1/40* (2013.01); *H01Q 1/225* (2013.01); *H01Q 1/2283* (2013.01); *H01Q 1/42* (2013.01); *H01Q 9/0407* (2013.01); *H01Q 13/02* (2013.01)

(58) Field of Classification Search

CPC ........ H01Q 1/225; H01Q 1/2283; H01Q 1/40; H01Q 1/42; H01Q 9/0407; H01Q 13/02

See application file for complete search history.

(56) References Cited

U.S. PATENT DOCUMENTS

| | | | | |
|---|---|---|---|---|
| 11,499,861 | B2 | 11/2022 | Mueller et al. | |
| 11,796,375 | B2 | 10/2023 | Winfried et al. | |
| 2020/0264030 | A1* | 8/2020 | Mueller | G01S 7/032 |
| 2021/0341568 | A1* | 11/2021 | Hitzler | H01Q 1/225 |
| 2022/0082426 | A1* | 3/2022 | Wälde | G01S 7/032 |

FOREIGN PATENT DOCUMENTS

| | | | |
|---|---|---|---|
| EP | 3 696 515 | A1 | 8/2020 |
| EP | 3 696 516 | A1 | 8/2020 |
| EP | 3 971 611 | A1 | 3/2022 |
| WO | WO 2020/120059 | A1 | 6/2020 |

OTHER PUBLICATIONS

German Office Action issued in German application 10 2023 200 856.4 on Oct. 31, 2023, 9 pgs.

* cited by examiner

*Primary Examiner* — Daniel Munoz

(74) *Attorney, Agent, or Firm* — Oblon, McClelland, Maier & Neustadt, L.L.P.

(57) ABSTRACT

A radio frequency unit for use in a potentially explosive atmosphere is provided, including: a carrier element, on which a radio frequency element is arranged, the radio frequency element being configured to transmit and/or receive a radio frequency signal; a housing, which delimits the radio frequency element at least in sections; and an excitation element arranged on the radio frequency element and configured to transmit the radio frequency signal, an inside of the housing being potted with a potting compound. A fill level measuring device including the radio frequency unit, and a method of manufacturing the radio frequency unit, are also provided.

15 Claims, 7 Drawing Sheets

RADIO FREQUENCY UNIT, FILL LEVEL MEASURING DEVICE, AND METHOD

CROSS-REFERENCE TO RELATED APPLICATIONS

This application claims the benefit of priority under 35 U.S.C. § 119 from German Patent Application No. 10 2023 200 856.4 filed on 2 Feb. 2023, the entire content of which is incorporated herein by reference.

TECHNICAL FIELD

The present invention relates to a radio frequency unit, in particular for use in a potentially explosive atmosphere. The present invention also relates to a fill level measuring device and to a method for manufacturing such a radio frequency unit.

BACKGROUND

With radar devices, especially in fill level measurement technology, but also in production automation, there is a problem of coupling the radio frequency signal from a circuit board or a radio frequency chip to the antenna.

When a radio frequency module is to be used in a potentially explosive environment, special explosion protection requirements must be taken into account. Air inclusions usually occur in the structure, as air is the medium with the smallest losses for microwaves. This may occur, for example, at the transition from the chip to the waveguide or between the module housing and the RF chip. These air pockets in radio frequency modules are very problematic in terms of explosion protection regulations. For example, the available electrical power must be kept so low that no ignition of a flammable material can occur. This is referred to as the intrinsic safety of the circuit.

It has turned out that there is a need to provide a radio frequency unit that is suitable for use in potentially explosive atmospheres.

It is a task of the present invention to provide a radio frequency unit, in particular for a sensor arrangement. Furthermore, it is a task of the present invention to provide a fill level measuring device and a method for manufacturing such a radio frequency unit.

These and other tasks, which will be mentioned when reading the following description or which can be recognized by a skilled person, are solved by the subject matter of the independent claims. The dependent claims further form a central idea of the present invention in a particularly advantageous manner.

SUMMARY

According to a first aspect of the invention, a radio frequency unit is provided, particularly for use in a potentially explosive atmosphere, comprising a carrier element on which a radio frequency element is arranged, the radio frequency element being set up to transmit and/or receive a radio frequency signal, in particular a radar signal, a housing which bounds the radio frequency element at least in sections, an exciter element which is arranged on the radio frequency element and is set up to transmit the radio frequency signal, the interior of the housing being potted with a potting compound, particularly a non-conductive material, for example a dielectric.

In particular, it may be provided that the housing is arranged on the radio frequency element and the potting compound is arranged in the housing in such a way that no air pockets or chambers are formed, which are adjacent to an electrically conductive element. This means that the air space within the housing may be completely replaced by the potting compound. This prevents air entrapment, thus offering advantages in terms of explosion protection.

Radio frequency units are used in radar devices, particularly in fill level measurement technology, but also in production automation. The radio frequency unit is adapted to be used preferably in a potentially explosive area. This means that there may be a flammable medium in the vicinity of the radio frequency unit.

The radio frequency element is arranged on the carrier element. The radio frequency element may be arranged on the carrier element or connected to the carrier element by means of bonding wires, by a soldered connection or by bonding as a flip-chip assembly, for example.

The radio frequency element is configured to transmit or receive a radio frequency signal, for example a radar signal, in particular >70 GHz or >100 GHz.

The exciter element transmits the radio frequency signal from the radio frequency element, for example into a waveguide or antenna. The radio frequency signal may also be emitted directly from the radio frequency element, for example in the direction of a lens.

The housing limits the radio frequency element at least in sections. More precisely, the housing limits at least the electrically conductive elements or components in the area of the radio frequency circuit during operation. In the simplest case, this may only be a radio frequency chip, but it may also be additional discrete components including a carrier substrate or a PCB, respectively. The housing is designed to accommodate the potting compound or an insulating material. This means that the housing must have a geometry that is suitable for accommodating a potting compound.

The potting compound (insulating material) is, during production, initially in a liquid state. After insertion into the housing, the potting compound (insulating material) hardens. The potting compound is arranged in the housing in such a way that no air pockets or chambers are formed. In particular, no air pockets or chambers are formed that are adjacent to an electrically conductive element.

Advantageously, the potting compound has a relative permittivity (DK value) matched to the arrangement. It may be advantageous for better coupling of the radio frequency signal from the radio frequency chip to the waveguide if the relative permittivity of the potting compound is lower than the relative permittivity of the dielectric waveguide (excitation element). If the dielectric has a DK value of 3, it may be advantageous if the potting compound has a DK value <3, e.g., 2.5.

The housing is arranged on the radio frequency element in such a way that all electrically conductive elements or components inside the housing may be potted with the potting compound or are potted and/or surrounded by it. The housing is at least partially closed for this purpose. The housing may have a polygonal and/or cylindrical geometry.

The radio frequency chip together with the substrate and coupling to the waveguide or antenna) are connected to each other by inserting the potting compound without trapping air. There are therefore no active electrical lines in the direction of the potentially explosive area. Electrical barriers to limit the power upstream of the radio frequency module may be omitted.

In an embodiment, the exciter element comprises an electrically non-conductive material. This makes it possible that the exciter element does not have to be completely encapsulated with the potting compound, but may be adjacent to the potentially explosive area.

In an embodiment, the potting compound has a lower relative permittivity than the excitation element.

In an embodiment, the exciter element is arranged on the radio frequency element in the form of an antenna element, particularly of a patch element. The antenna element or patch element is the area of the radio frequency element from which the radio frequency signal is emitted or received again. It is therefore advantageous to arrange the exciter element on this area in order to achieve the best possible coupling of the radio frequency signal. Coupling refers to the tapping of the radio frequency signal from the radiating structure (antenna element) on the radio frequency element.

In an embodiment, the housing comprises a waveguide, in particular a waveguide or a dielectric waveguide. In other words, the waveguide, in particular the waveguide or the dielectric waveguide, is arranged on the housing or connected to the housing. The waveguide is preferably arranged on an axis with the antenna element or the patch element.

In an embodiment, the carrier element comprises a printed circuit board and/or a semiconductor element. Consequently, the radio frequency unit is suitable for being arranged on a printed circuit board or a semiconductor element, for example a wafer.

In an embodiment, the exciter element has a cylindrical and/or conical geometry. This allows the exciter element to extend into the waveguide, in particular into the hollow waveguide, at least in sections. In other words, the exciter element may be able to be integrated into the waveguide.

In an embodiment, the structure above the radio frequency element, in this case an RF chip, comprises an additional coupling element on which a further excitation element is arranged. The coupling element comprises, for example, a glass plate on which the excitation element may be arranged. In addition, the glass plate may comprise a further coupling structure (radiating element, resonant geometry, e.g., patch element).

In an embodiment, the housing comprises at least an opening for inserting the potting compound. Alternatively, several openings are conceivable. The opening is preferably arranged at the highest point of the housing 13 facing away from the direction of gravity or away from the carrier element 11, as shown, for example, in FIGS. 1-4 and 9-13. This allows the liquid potting compound to spread evenly and reduces or completely prevents the formation of air pockets.

In an embodiment, the housing has at least one vent opening. This allows excess air to escape from the housing during filling, which further reduces or prevents the formation of air pockets.

In an embodiment, the housing is connected to the waveguide, in particular the waveguide or the dielectric waveguide, by means of at least one web or bridge. In this embodiment, the housing is open at the top in the direction of gravity. This means that the radio frequency element or the electrically conductive areas of the radio frequency element, which are to be shielded/insulated by the potting compound, are laterally limited by the housing. Besides, the space formed may be able to be filled with the potting compound so that the electronic components are protected.

In an embodiment, an antenna is arranged on the waveguide. The waveguide, the housing and the antenna may be designed in one or more parts. For example, the housing and the waveguide are formed in one piece and the antenna is a separate component. Further design combinations are conceivable.

According to a further aspect of the present invention, a fill level measuring device is provided, in particular a radar fill level measuring device, comprising a radio frequency unit according to any one of the preceding embodiments.

A further aspect of the invention relates to a method of manufacturing a radio frequency unit according to any one of the preceding embodiments, comprising: Providing a carrier element, providing a radio frequency element, arranging the radio frequency element on the carrier element, and connecting the radio frequency element to the carrier element, arranging an excitation element on the radio frequency element, arranging a housing on the radio frequency element, potting the interior of the housing with a potting compound.

BRIEF DESCRIPTION OF THE FIGURES

A detailed description of the figures is given below, depicting.

DETAILED DESCRIPTION OF EMBODIMENTS

Figure 1:
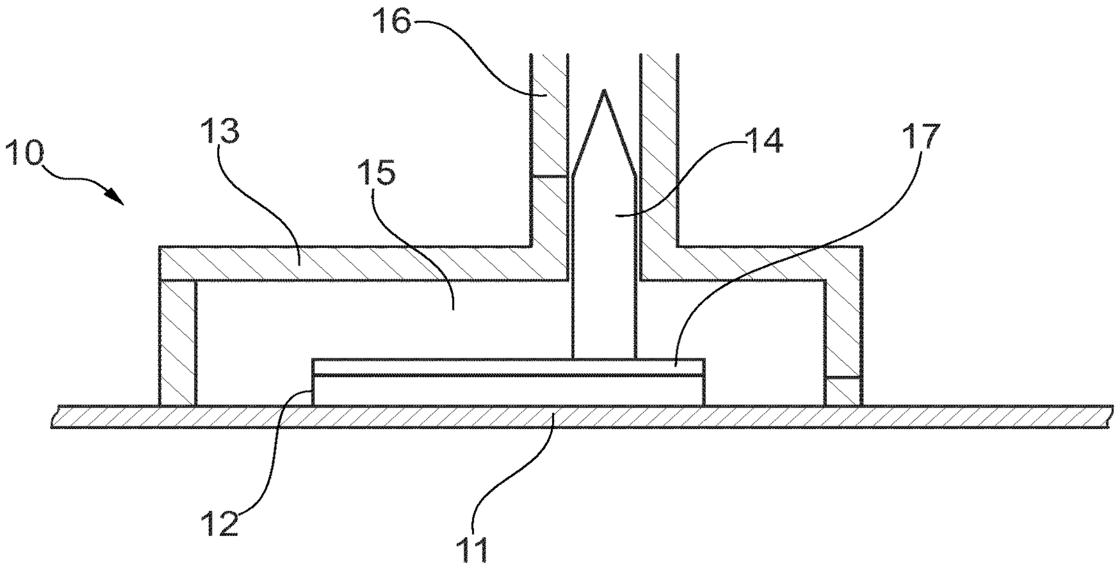
FIG. 1 shows a schematic view of an embodiment of a radio frequency unit according to an embodiment.

FIG. 1 shows a radio frequency unit 10. The radio frequency unit 10 comprises a carrier element 11 on which a radio frequency element 12 is arranged. The carrier element 11 may for example, be a printed circuit board or a semiconductor element.

The radio frequency element 12 is arranged on the carrier element 11 or connected to the carrier element 11 by means of wire bonding, for example. Alternatively, other methods, such as soldering or gluing, are conceivable.

The radio frequency element 12 is surrounded by a housing 13. More precisely, the housing 13 delimits the radio frequency element 12 at least in sections. In the embodiment shown, the housing 13 surrounds the entire radio frequency element 12. Alternatively, it is possible for the housing 13 to delimit at least the electrically conductive areas of the radio frequency element 12.

The housing 12 also comprises a waveguide 16. In the embodiment shown, the waveguide 16 is a hollow waveguide. Alternatively, a dielectric waveguide may also be used. The waveguide 16 is hollow cylindrical. It is possible that the waveguide 16 has a hollow cylindrical section.

An exciter element 14 is arranged on the radio frequency element 12. The exciter element 14 has a cylindrical shape. The free end of the excitation element 14 is designed as a conical tip. The exciter element 14 is made of a non-conductive material. The exciter element 14 extends into the waveguide 16, in this case into the waveguide. The inner diameter of the hollow cylindrical waveguide 16 essentially corresponds to the outer diameter of the exciter element 14. This allows the exciter element 14 to extend almost without gaps in the waveguide 16. The exciter element may also be pressed or glued into the waveguide, to fix it in place.

During operation, the exciter element 14 picks up the radio frequency signal generated by the radio frequency element and forwards it. More precisely, the exciter element 14 forwards the radio frequency signal to the waveguide 16. It is conceivable that the exciter element 14 forwards the radio frequency signal to an antenna.

Between the radio frequency element 12 and the exciter element 14, a coupling element 17 is arranged. The coupling element 17 comprises, for example, a glass plate. It is possible that the coupling element 17 or the glass plate does not cover the radio frequency element 12 completely, but partially. This means that the coupling element 17 or the glass plate may be smaller than the radio frequency element 12. The exciter element 14 is preferably bonded to the coupling element 17 or to the radio frequency element 12.

In the housing 13, a potting compound 15 (not shown) is arranged. The potting compound 15 is a non-conductive material (dielectric) or an insulating material. The potting compound 15 is, for example, Glob Top or a comparable potting compound. The potting compound 15 surrounds all electrically conductive components of the radio frequency element 12 and at least partly the exciter element 14.

The section of the exciter element 14 that extends in the housing 13 is surrounded by the potting compound 15. The section of the exciter element 14 that extends in the waveguide 16 is not surrounded by the potting compound 15.

The potting compound 15 has no air pockets. This means that there are no gaps between the radio frequency element 12 and the potting compound 15. In particular, all electrically conductive areas of the radio frequency element 12 are completely encapsulated by the encapsulation compound 15.

Figure 2:
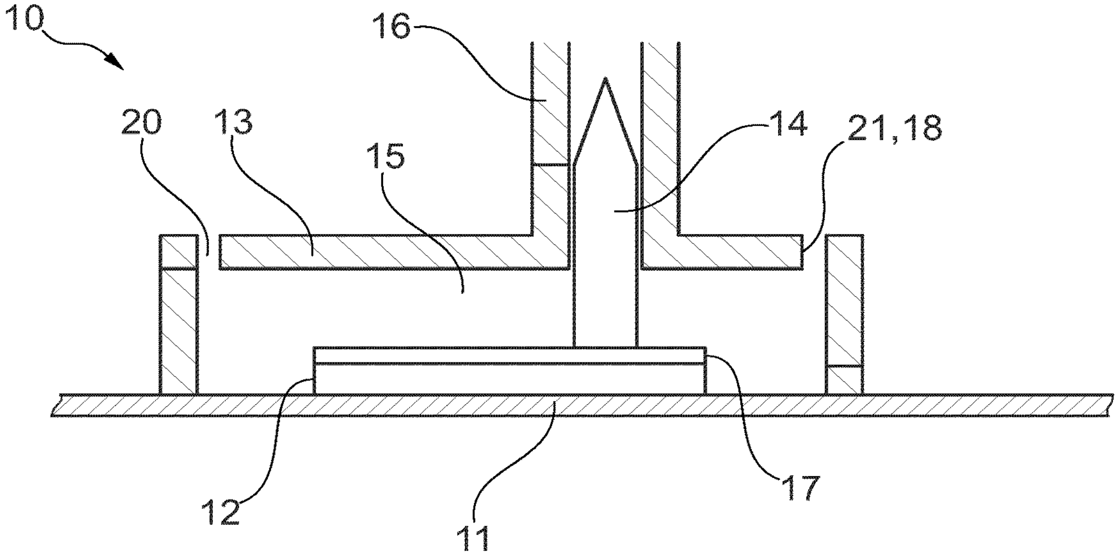
FIG. 2 shows a schematic view of a further embodiment of a radio frequency unit according to a further embodiment.

FIG. 2 shows an embodiment of the radio frequency unit 10 that is essentially identical to FIG. 1. FIG. 2 shows following differences to FIG. 1.

The housing 13 in FIG. 2 has two openings. The first opening 20 is intended for inserting the potting compound 15 into the housing 13. During insertion, the potting compound 15 is in a liquid state. After the potting compound 15 has been filled in, it hardens and becomes solid. The second opening 21 is intended to allow displaced air to escape when the potting compound 15 is inserted. The second opening 21 may therefore also be referred to as a vent opening 18.

Figure 3:
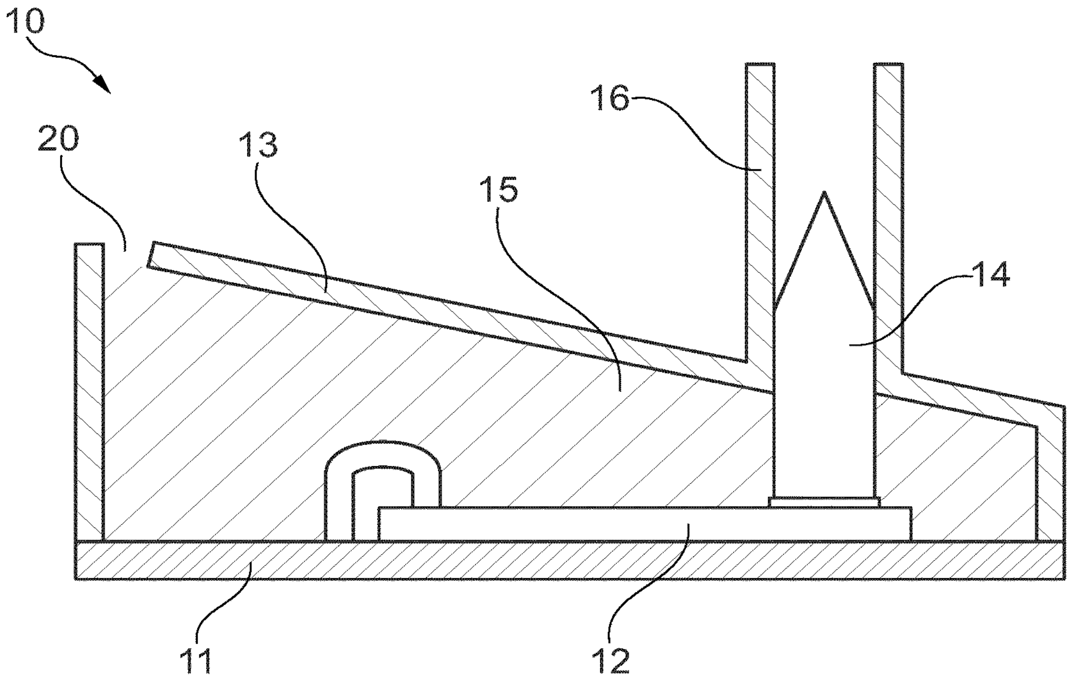
FIG. 3 shows a schematic view of a further embodiment of a radio frequency unit according to a further embodiment.

FIG. 3 shows a further embodiment with a first opening 20. FIG. 3 does not show a second opening 21. However, this does not rule out a second opening 21.

The housing 13 of the embodiment shown in FIG. 3 has a slope. The slope falls in the direction of the waveguide 16.

The first opening 20 is arranged at the highest point of the slope in the direction of gravity. As in the previous embodiment, the first opening 20 is intended for the introduction of the potting compound 15. The potting compound 15 is shown here by the hatched lines inside the housing 13.

Figure 4:
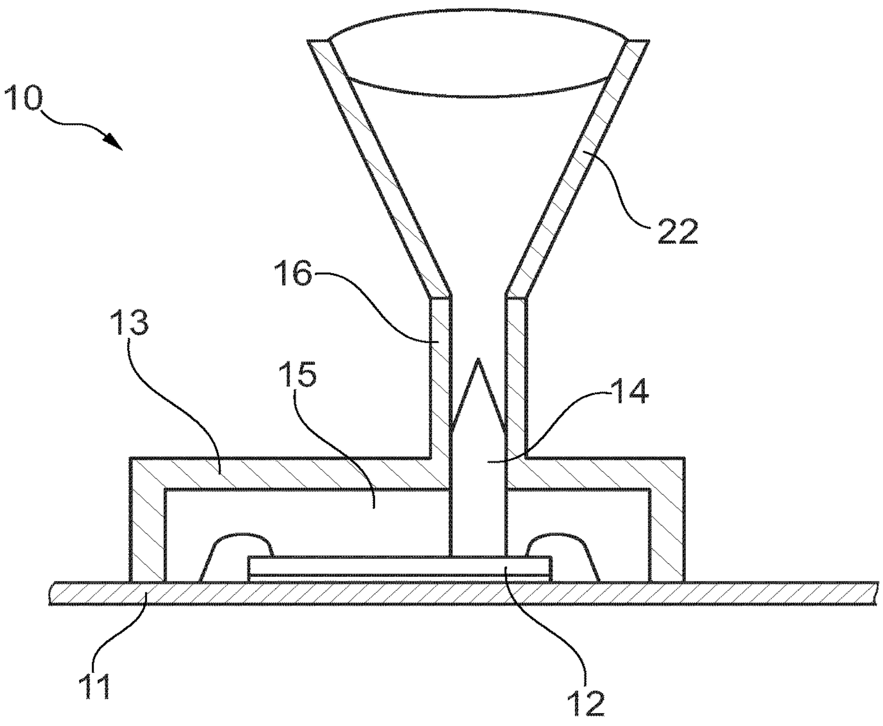
FIG. 4 shows a schematic view of a further embodiment of a radio frequency unit according to a further embodiment.

FIG. 4 shows an embodiment that essentially corresponds to the embodiment shown in FIG. 1. FIG. 4 differs from FIG. 1 in that an antenna 22, in particular a horn antenna, is arranged on the waveguide 16, in this case the waveguide. In other words, the antenna 22 is directly connected to the waveguide.

Figure 5:
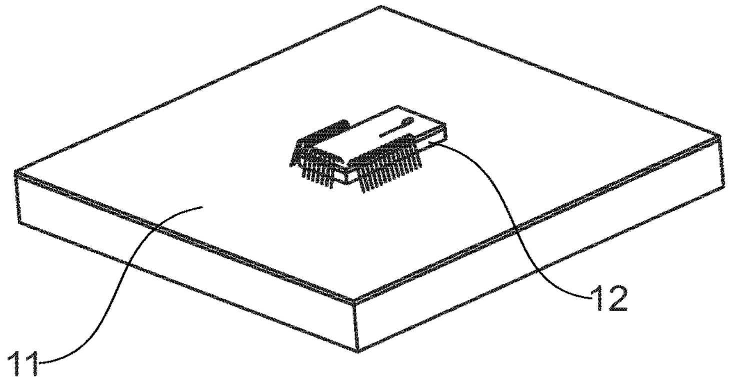
FIG. 5 shows a perspective view of a further embodiment of a radio frequency unit according to a further embodiment.
Figure 6A:
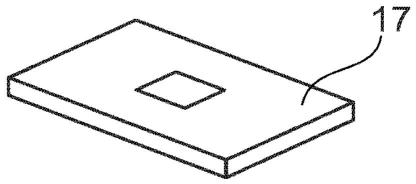
FIG. 6*a* shows a perspective view of a coupling element.
Figure 6B:
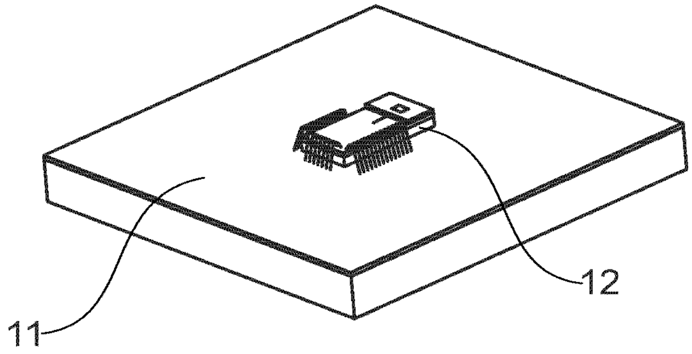
FIG. 6*b* shows a perspective view of the radio frequency unit as shown in FIG. 5 and with the coupling element as shown in FIG. 6*a,*

FIG. 5 shows the radio frequency element 12 on the carrier element 11 during assembly. FIG. **6*a* shows the coupling element 17 in enlarged form, and FIG. 6*b* shows the radio frequency element 12 with the coupling element 17. The coupling event 17 may be a glass plate. The coupling element 17 is attached to an antenna element, for example a patch element. The antenna element may also be referred to as a radiating element. The coupling element 17** is arranged on the antenna element.

Figure 7:
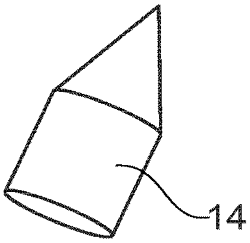
FIG. 7 shows a perspective view of an exciter element.
Figure 8:
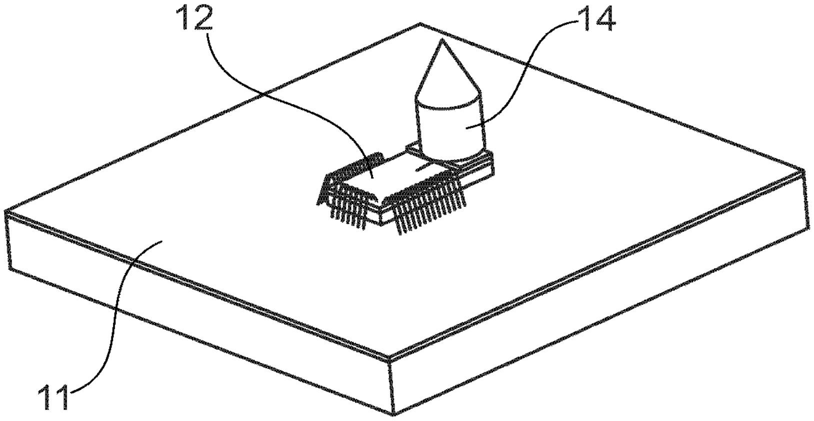
FIG. 8 shows a perspective view of the radio frequency unit according to FIG. 6*b* with the exciter element according to FIG. 7.
Figure 9:
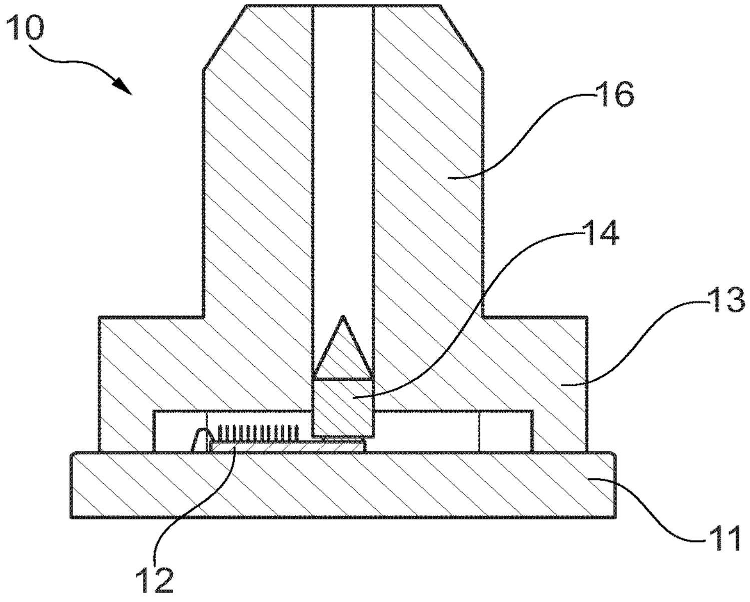
FIG. 9 shows a sectional view of a further embodiment of a radio frequency unit according to a further embodiment.

FIG. 7 shows the exciter element 14 in detail. The exciter element 14 has a cylindrical shape. At one free end of the cylindrical shape, the exciter element 14 has a conical shape. FIG. 8 shows an arrangement of the exciter element 14 on the coupling element 17.

FIG. 9, FIG. 10, FIG. 11, and FIG. 12 show a possible embodiment of a housing 13 that may be used with the radio frequency element 12 according to FIG. 8. The housing 13 is closed. More precisely, the housing 13 is closed in a direction away from the carrier element 11.

The housing 13 comprises a waveguide 16 in the form of a waveguide. The waveguide has a cylindrical geometry. The free end of the waveguide has a chamfer. The exciter element 14 extends into the waveguide in sections.

Figure 10:
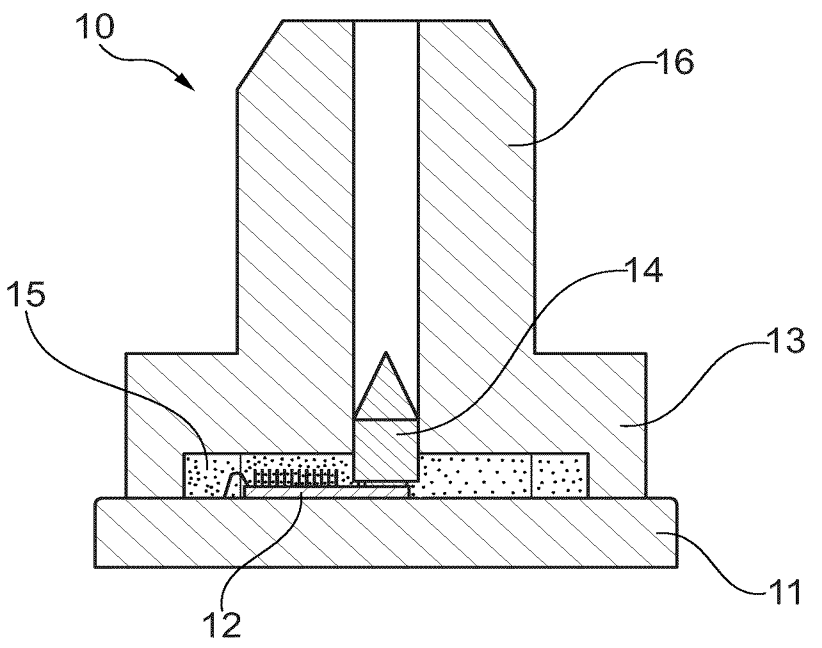
FIG. 10 shows a sectional view of the radio frequency unit as shown in FIG. 9 with potting compound.
Figure 11:
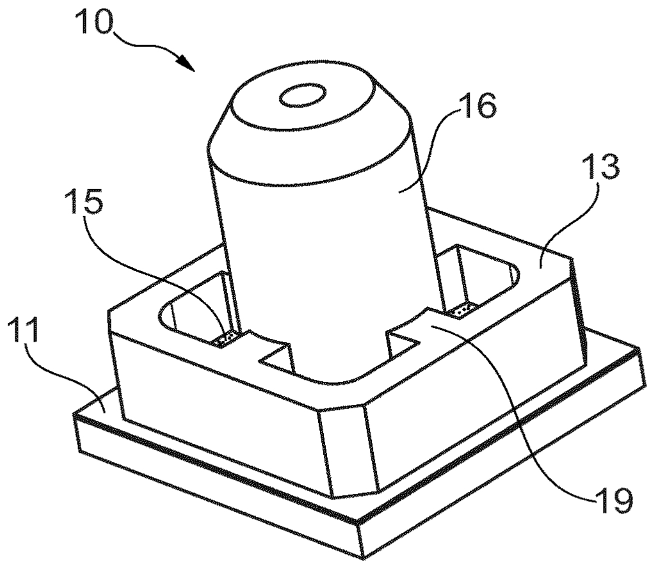
FIG. 11 shows a perspective view of a further embodiment of a radio frequency unit according to an embodiment.
Figure 12:
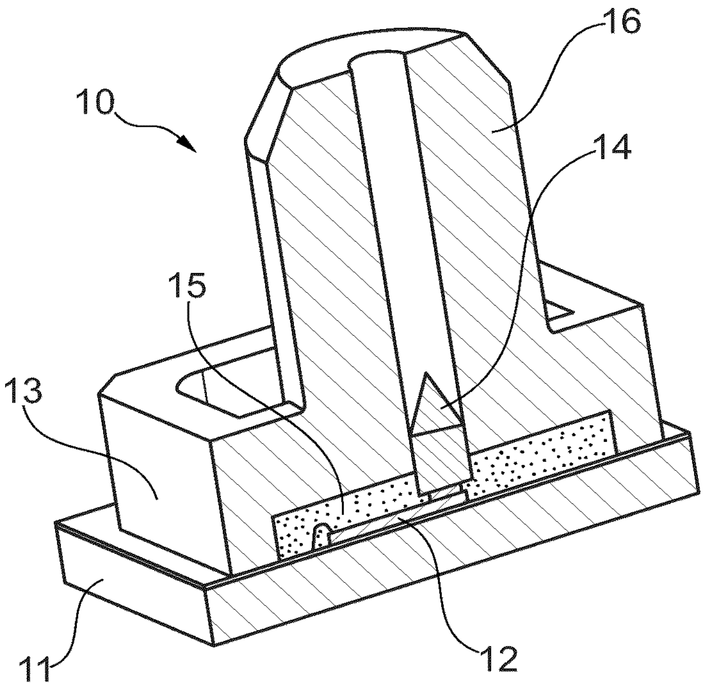
FIG. 12 shows a sectional view of the radio frequency unit as shown in FIG. 11.

FIG. 10, FIG. 11, and FIG. 12 show the radio frequency unit 10 in its finished state. Here, the housing 13 is filled with the potting compound 15 (dotted area). FIG. 11 shows that the housing 13 is open at the top in a direction orthogonal to the carrier element 11. The waveguide 16 is arranged in the center of the housing 13. The inner wall of the housing 13 is connected to the waveguide 16 by four webs or bridges 19. The liquid potting compound 15 may be inserted through the open areas between the webs.

Figure 13:
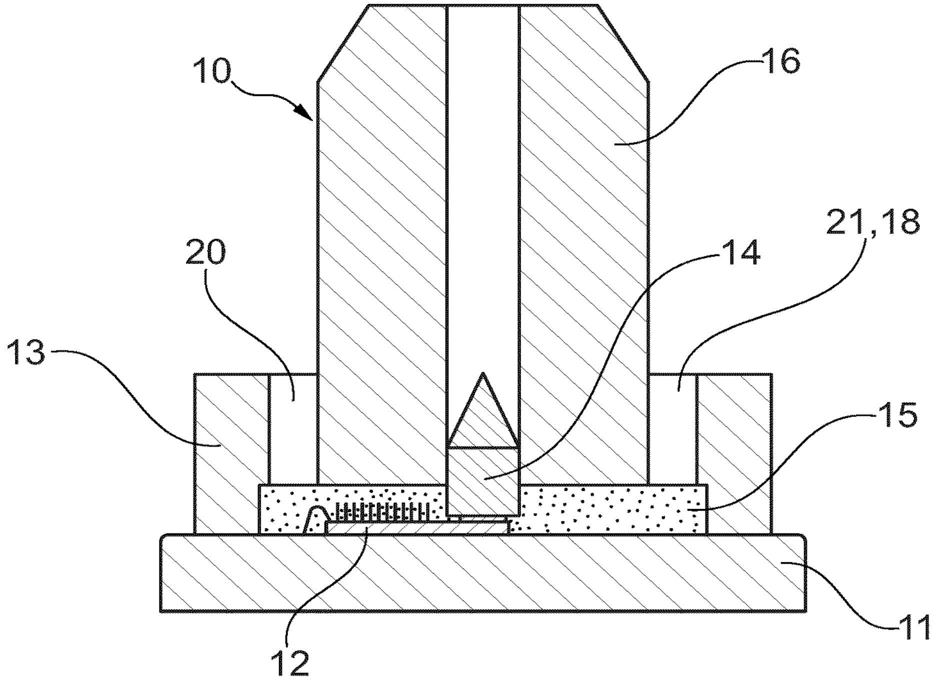
FIG. 13 shows a sectional view of a further embodiment of a radio frequency unit according to a further embodiment.

FIG. 13 shows a housing 13 that is closed in a direction facing away from the carrier element 11 or orthogonal to the carrier element. The housing 13 has the first opening 20 and the second opening 21 for filling the potting compound 15. The other features correspond to the embodiment shown in FIG. 9 to FIG. 12.

Figure 14:
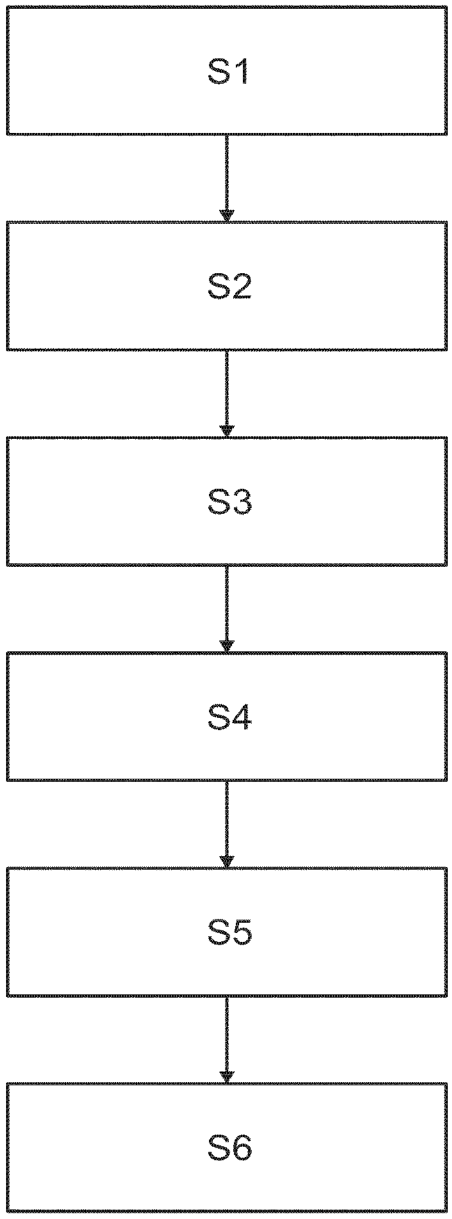
FIG. 14 shows a flow chart of a method according to an embodiment.

FIG. 14 shows a sequence of a method for manufacturing the radio frequency unit 10.

In a first step S1, the carrier element 11, for example a printed circuit board (PCB) or a semiconductor element or a wafer, is provided.

In a second step S2, the radio frequency element 12 is provided. The radio frequency element 12 or the radio frequency chip contains, for example, an antenna element or radiating element (e.g., a patch element). For example, a coupling element, preferably a glass plate with a further radiating element, is bonded to this radiating element.

Then, in a third step S3, the radio frequency element 12 is placed on the carrier element 11. The radio frequency element 12 and the carrier element 11 are connected to each other, for example by wire bonding, gluing, or soldering.

In a fourth step S4, the excitation element 14 is arranged on the radio frequency element 12. Preferably, the excitation element 14 is bonded to the radio frequency element 12.

In a fifth step S5, the housing 13 is arranged on the radio frequency element 12. The housing 13 is arranged on the radio frequency element 12 in such a way that the electrically conductive elements or electrical lines of the radio frequency unit 12 are at least partially limited.

In a sixth step S6, the inside of the housing 13 is potted with a potting compound 15. For example, Glob Top or a similar material may be used. The potting compound 15 is in a liquid state when it is inserted. After inserting, the potting compound 15 hardens without air inclusions in the housing 13. In other words, the radio frequency element and the environment are electrically isolated.

However, the present invention is not limited to the preceding preferred embodiments as long as it is encompassed by the subject matter of the following claims. In addition, it is noted that the terms "comprising" and "comprising" do not exclude other elements or steps and the indefinite articles "one" or "a" do not exclude a plurality. Furthermore, it is noted that features or steps described with reference to one of the above embodiments may also be used in combination with other features or steps of other embodiments described above. Furthermore, it is possible to change the order of the steps mentioned.

LIST OF REFERENCE SYMBOLS

10 radio frequency unit
11 carrier element
12 radio frequency element
13 housing
14 excitation element
15 potting compound
16 waveguide
17 coupling element
18 vent opening
19 web or bridge
20 first opening
21 second opening
22 antenna

The invention claimed is:

1. A radio frequency unit for use in a potentially explosive atmosphere, comprising:
- a carrier element, on which a radio frequency element is arranged, the radio frequency element being configured to transmit and/or receive a radio frequency signal;
- a housing, which delimits the radio frequency element at least in sections; and
- an excitation element arranged on the radio frequency element and configured to transmit the radio frequency signal,
- wherein an inside of the housing is potted with a potting compound, and
- wherein the housing comprises at least one opening configured for insertion of the potting compound.

2. The radio frequency unit according to claim 1, wherein the excitation element comprises an electrically non-conductive material.

3. The radio frequency unit according to claim 1, wherein the potting compound has a lower relative permittivity than the excitation element.

4. The radio frequency unit according to claim 1, wherein the excitation element is arranged on an antenna element.

5. The radio frequency unit according to claim 1, wherein the excitation element is arranged on a patch element.

6. The radio frequency unit according to claim 1, wherein the housing comprises a waveguide.

7. The radio frequency unit according to claim 6, wherein an antenna is arranged at the waveguide.

8. The radio frequency unit according to claim 1, wherein the housing comprises a dielectric waveguide.

9. The radio frequency unit according to claim 1, wherein the carrier element comprises a printed circuit board and/or a semiconductor element.

10. The radio frequency unit according to claim 1, wherein the excitation element has a cylindrical and/or a conical geometry.

11. The radio frequency unit according to claim 1, wherein the radio frequency element comprises a coupling element on which the excitation element is arranged.

12. A fill level measuring device comprising a radio frequency unit according to claim 1.

13. A method of manufacturing a radio frequency unit according to claim 1, the method comprising:
- providing a carrier element;
- providing a radio frequency element;
- arranging the radio frequency element on the carrier element and connecting the radio frequency element to the carrier element;
- arranging an excitation element on the radio frequency element;
- arranging a housing on the radio frequency element; and
- potting an inside of the housing with a potting compound.

14. A radio frequency unit for use in a potentially explosive atmosphere, comprising:
- a carrier element, on which a radio frequency element is arranged, the radio frequency element being configured to transmit and/or receive a radio frequency signal;
- a housing, which delimits the radio frequency element at least in sections; and
- an excitation element arranged on the radio frequency element and configured to transmit the radio frequency signal,
- wherein an inside of the housing is potted with a potting compound, and
- wherein the housing comprises at least one vent opening.

15. A radio frequency unit for use in a potentially explosive atmosphere, comprising:
- a carrier element, on which a radio frequency element is arranged, the radio frequency element being configured to transmit and/or receive a radio frequency signal;
- a housing, which delimits the radio frequency element at least in sections; and
- an excitation element arranged on the radio frequency element and configured to transmit the radio frequency signal,
- wherein an inside of the housing is potted with a potting compound,
- wherein the housing comprises a waveguide, and
- wherein the housing is connected to the waveguide by means of at least one web.

* * * * *